United States Patent
Stewart et al.

(10) Patent No.: US 8,897,955 B2
(45) Date of Patent: Nov. 25, 2014

(54) OZONE CONVERTING CATALYST FAULT IDENTIFICATION SYSTEMS AND METHODS

(75) Inventors: Etsuko Muraji Stewart, Laingsburg, MI (US); Scott H. Wittkopp, Ypsilanti, MI (US); Stuart R. Smith, Howell, MI (US)

(73) Assignee: GM Global Technology Operations LLC

( * ) Notice: Subject to any disclaimer, the term of this patent is extended or adjusted under 35 U.S.C. 154(b) by 216 days.

(21) Appl. No.: 13/404,513

(22) Filed: Feb. 24, 2012

(65) Prior Publication Data
US 2013/0103254 A1     Apr. 25, 2013

Related U.S. Application Data

(60) Provisional application No. 61/548,950, filed on Oct. 19, 2011.

(51) Int. Cl.
*G06F 7/00* (2006.01)

(52) U.S. Cl.
CPC .................................... *G06F 7/00* (2013.01)
USPC ..................................................... 701/34.4

(58) Field of Classification Search
CPC ....... G01N 27/00; G01N 31/00; G01N 31/10; G06F 7/00
USPC ........... 701/29.1, 29.9, 30.1, 33.7, 33.8, 33.9, 701/34.4
See application file for complete search history.

(56) References Cited

U.S. PATENT DOCUMENTS

| | | | |
|---|---|---|---|
| 4,203,946 A | 5/1980 | Ryerson | |
| 4,240,798 A | 12/1980 | Wendelin et al. | |
| 4,243,631 A | 1/1981 | Ryerson | |
| 4,294,801 A | 10/1981 | Segawa et al. | |
| 4,401,967 A | 8/1983 | Miwa et al. | |
| 4,885,929 A | 12/1989 | Kasahara et al. | |
| 5,077,970 A | 1/1992 | Hamburg | |
| 5,422,331 A | 6/1995 | Galligan et al. | |
| 5,509,267 A | 4/1996 | Theis | |
| 5,533,332 A | 7/1996 | Uchikawa | |
| 5,545,377 A | 8/1996 | Fukaya et al. | |
| 5,546,004 A | 8/1996 | Schmelz | |
| 5,811,662 A | 9/1998 | Williams et al. | |
| 5,848,527 A | 12/1998 | Mitsutani | |
| 5,896,743 A | 4/1999 | Griffin | |
| 6,145,304 A | 11/2000 | Takahashi et al. | |

(Continued)

FOREIGN PATENT DOCUMENTS

JP     2007-64683     3/2007

OTHER PUBLICATIONS

Gengchen Wang, "Atmospheric Ozone Layer and Ozone Hole", 2005, P89, Chapter Three, Beijing, Meteorological Press, (6 pages). (with English translation).

*Primary Examiner* — Kim T Nguyen

(57) ABSTRACT

A system for a vehicle includes a conversion efficiency module, a threshold determination module, and a catalyst fault indication module. The conversion efficiency module generates an ozone conversion efficiency of a catalyst that converts ozone into oxygen based on a first amount of ozone in air measured upstream of the catalyst and a second amount of ozone in air measured downstream of the catalyst. The threshold determination module generates an efficiency threshold based on ambient humidity. The catalyst fault indication module selectively indicates that a fault is present in the catalyst when the ozone conversion efficiency is less than the efficiency threshold.

20 Claims, 6 Drawing Sheets

(56) References Cited

U.S. PATENT DOCUMENTS

| | | |
|---|---|---|
| 6,506,605 B1 | 1/2003 | Allen et al. |
| 6,543,217 B2 | 4/2003 | Ålleving et al. |
| 6,660,231 B2 | 12/2003 | Moseley |
| 6,797,517 B1 | 9/2004 | Hoshi et al. |
| 6,803,236 B2 | 10/2004 | Bailey et al. |
| 6,823,727 B2 | 11/2004 | Friedel et al. |
| 6,835,356 B2 | 12/2004 | Okayama et al. |
| 7,038,579 B2 | 5/2006 | Hosoe et al. |
| 7,198,952 B2 | 4/2007 | Uchida et al. |
| 7,323,343 B2 | 1/2008 | Cox et al. |
| 7,926,333 B2 | 4/2011 | Odendall |
| 2001/0039928 A1 | 11/2001 | Alleving et al. |
| 2002/0110916 A1 | 8/2002 | Fleischer et al. |
| 2003/0066335 A1 | 4/2003 | Friedel et al. |
| 2003/0093990 A1 | 5/2003 | Bayerle et al. |
| 2003/0131650 A1* | 7/2003 | Bayerle et al. ............ 73/1.06 |
| 2004/0184962 A1 | 9/2004 | Klee et al. |
| 2005/0123455 A1 | 6/2005 | Inaba et al. |
| 2011/0073285 A1 | 3/2011 | Benoit et al. |
| 2011/0121582 A1 | 5/2011 | Alexander et al. |
| 2011/0201124 A1 | 8/2011 | Schork et al. |
| 2013/0034911 A1 | 2/2013 | Wittkopp et al. |

* cited by examiner

US 8,897,955 B2

OZONE CONVERTING CATALYST FAULT IDENTIFICATION SYSTEMS AND METHODS

CROSS-REFERENCE TO RELATED APPLICATIONS

This application claims the benefit of U.S. Provisional Application No. 61/548,950, filed on Oct. 19, 2011. The disclosure of the above application is incorporated herein by reference in its entirety.

FIELD

The present application relates to internal combustion engines and more particularly ozone control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Combustion of an air/fuel mixture within an internal combustion engine of a vehicle generates heat. Cooling the engine is a cyclical process. Cool engine coolant absorbs heat from the engine, and the (warmed) engine coolant is circulated to a radiator. The radiator facilitates heat transfer from the engine coolant to air passing the radiator. The (cooled) engine coolant is circulated from the radiator back to the engine to absorb more heat from and cool the engine.

A cooling fan may also be implemented to provide airflow past the radiator at times when little air may otherwise pass the radiator. For example only, the cooling fan may be activated to provide airflow past the radiator when a vehicle speed is low or when an aerodynamic shutter is open and airflow past the radiator is low.

The radiator or another heat exchanging structure may implement one or more features to reduce an amount of ground-level ozone ($O_3$) in the air flowing into an engine compartment of the vehicle. For example, at least a portion of a surface of the radiator may be coated with a catalyst that converts the ozone in the air into (diatomic) oxygen ($O_2$). For example only, the catalyst may include a PremAir coating that converts three molecules of ozone to two molecules of oxygen.

SUMMARY

A system for a vehicle includes a conversion efficiency module, a threshold determination module, and a catalyst fault indication module. The conversion efficiency module generates an ozone conversion efficiency of a catalyst that converts ozone into oxygen based on a first amount of ozone in air measured upstream of the catalyst and a second amount of ozone in air measured downstream of the catalyst. The threshold determination module generates an efficiency threshold based on ambient humidity. The catalyst fault indication module selectively indicates that a fault is present in the catalyst when the ozone conversion efficiency is less than the efficiency threshold.

In other features, a method for a vehicle, includes: generating an ozone conversion efficiency of a catalyst that converts ozone into oxygen based on a first amount of ozone in air measured upstream of the catalyst and a second amount of ozone in air measured downstream of the catalyst; generating an efficiency threshold based on ambient humidity; and selectively indicating that a fault is present in the catalyst when the ozone conversion efficiency is less than the efficiency threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A vehicle system of the present disclosure includes a radiator or other heat exchanger. A catalyst that is applied to the radiator converts ozone ($O_3$) into oxygen ($O_2$). The ability of the catalyst to convert the ozone may decrease over time. For example only, airborne particulate matter may mask the surface of the catalyst over time, preventing air from contacting the catalyst.

The vehicle system includes at least first and second ozone sensors. The first ozone sensor senses ozone in the air flowing into the radiator. The second ozone sensor senses ozone in the air flowing out of the radiator. Accordingly, the measurements of the first and second ozone sensors are indicative of an amount of ozone converted by the catalyst. The amount of ozone converted by the catalyst is indicative of the catalyst's ability to convert ozone into oxygen. A fault in the catalyst can be identified when the amount of ozone converted by the catalyst is less than a predetermined amount.

Figure 1:
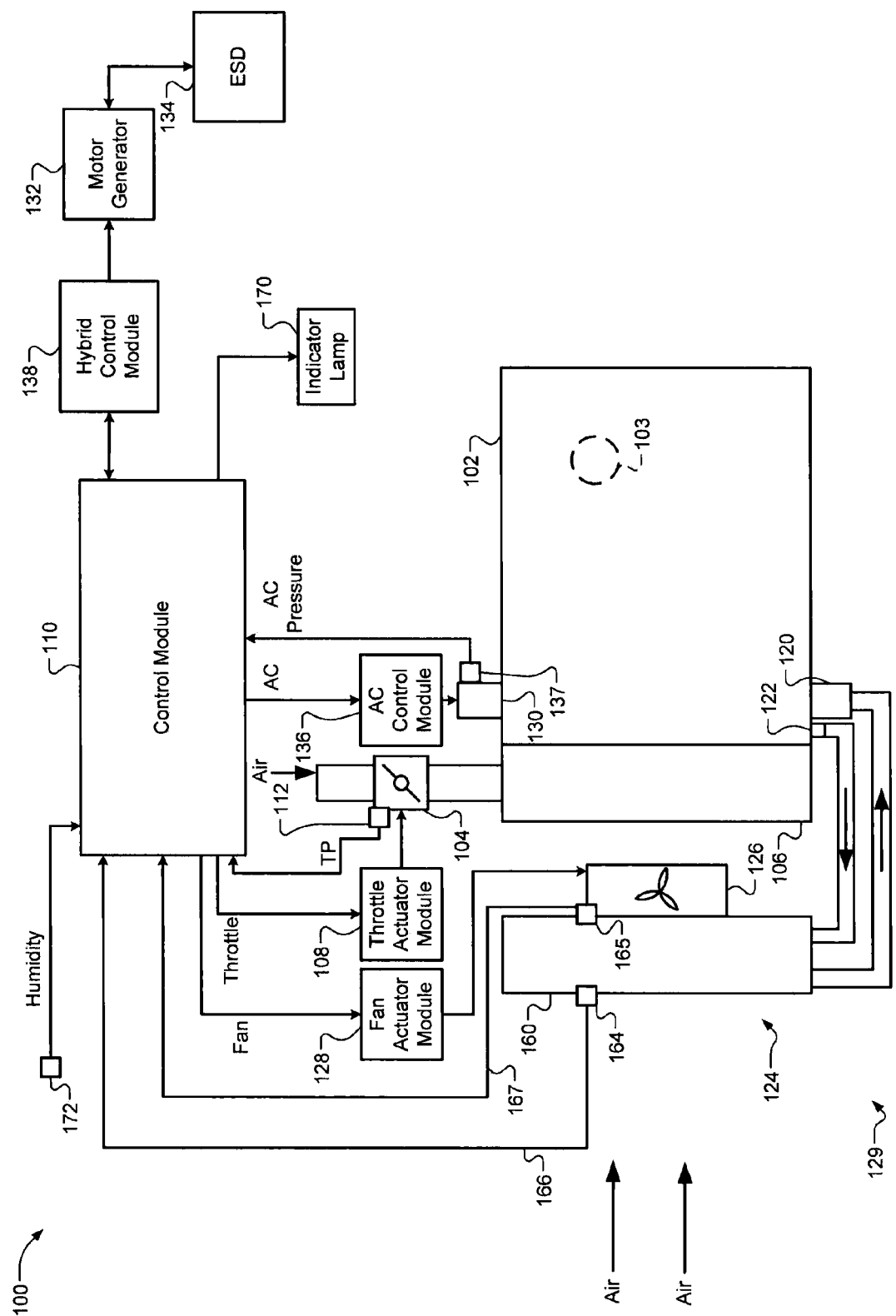
FIG. 1 is a functional block diagram of an example vehicle system implementing ozone sensors according to the present disclosure.

Referring now to FIG. 1, a functional block diagram of an example vehicle system 100 is presented. An engine 102 combusts an air/fuel mixture within one or more cylinders to produce torque for a vehicle. While only cylinder 103 is shown, the engine 102 may include more than one cylinder. Air is drawn into the engine 102 through a throttle valve 104 and an intake manifold 106.

A throttle actuator module 108 controls opening of the throttle valve 104 based on signals from a control module 110. A throttle position (TP) sensor 112 measures a TP (e.g., opening percentage) and generates a TP signal based on the position. Torque produced by the engine 102 may be output via a crankshaft (not shown).

Combustion of the air/fuel mixture generates heat. A coolant may be used to selectively draw heat away from and cool the engine 102. A coolant pump 120 circulates the coolant. When a thermostat 122 is in a closed state, the coolant pump 120 circulates the coolant through coolant channels (not shown) within the engine 102. When the thermostat 122 is in an open state, coolant within the engine 102 is circulated to a radiator 124, and coolant within the radiator 124 is circulated to the engine 102. The thermostat 122 may open when a temperature of the coolant is greater than a predetermined opening temperature. For example only, the predetermined opening temperature may be approximately 85-95° Celsius.

The radiator 124 facilitates heat transfer from the coolant to air passing the radiator 124. In this manner, the radiator 124 facilitates cooling of the coolant. Cooler coolant can then be circulated back to the engine 102 to cool the engine 102. One or more fans, such as fan 126, may push or draw air across the radiator 124 to increase the airflow passing the radiator 124. For example only, the fan 126 may be activated (i.e. turned ON) to increase the airflow through the radiator 124 when little air would flow through the radiator 124, such as when the vehicle is stopped or moving slowly.

A fan actuator module 128 may control the fan 126 (e.g., ON or OFF) based on signals from the control module 110. For example only, the control module 110 may activate the fan 126 when the coolant temperature is greater than a predetermined fan on temperature. The predetermined fan on temperature may be greater than the predetermined opening temperature and may be, for example, approximately 105° C. In various implementations, the fan 126 may include a variable speed fan, and the fan actuator module 128 may control the speed of the fan 126.

When more than one fan is implemented, the control module 110 may activate the fans at different predetermined fan on temperatures. For example only, when two fans are implemented, the control module 110 may activate one of the fans when the coolant temperature is greater than the predetermined fan on temperature and activate the other of the fans when the coolant temperature is greater than a second predetermined fan on temperature. The second predetermined fan on temperature may be greater than the predetermined fan on temperature and may be, for example, approximately 113° C.

The fan 126 may also be used to increase airflow within an engine compartment 129 in which the engine 102 is located. Increasing the airflow within the engine compartment 129 may cool components other than the engine 102, the engine coolant, and the radiator 124 that are located within the engine compartment 129. For example only, other components that may be implemented within the engine compartment 129 that may be cooled by the fan 126 may include an air conditioning (AC) unit 130, a motor generator 132, an energy storage device (ESD) 134, and other components implemented within the engine compartment 129. While the fan actuator module 128 is shown and described as being controlled by the control module 110, the fan actuator module 128 may control the fan 126 based on signals from another control module (not shown), such as a chassis control module, a body control module, a hybrid control module, or another suitable module.

An AC control module 136 may control the AC unit 130 based on signals from the control module 110. A compressor (not shown) of the AC unit 130 selectively compresses a refrigerant, and the compressor may be driven by the crankshaft of the engine 102. The AC unit 130 may provide cooling for a passenger cabin of the vehicle. An AC pressure sensor 137 measures pressure of the refrigerant and generates an AC pressure signal based on the pressure. While the AC control module 136 is shown and described as being controlled by the control module 110, the AC control module 136 may control the AC unit 130 based on signals from another control module (not shown), such as the chassis control module, the body control module, the hybrid control module, or another suitable module.

The motor generator 132 may provide one or more functions for the vehicle. For example only, the motor generator 132 may supplement the torque output of the engine 102 under some circumstances. The motor generator 132 may apply a braking torque to the engine 102 under some circumstances, such as for regenerative braking. Electrical energy generated by the motor generator 132 during regenerative braking may be stored in the ESD 134 and/or may be supplied to one or more vehicle systems for use. In some implementations, the motor generator 132 may also function as a starter of the engine 102 to crank the engine 102 when the engine 102 is not running. In such implementations, the motor generator 132 may be referred to as a belt alternator starter (BAS). While only the motor generator 132 is shown; the vehicle may include more than one motor generator 132 and more than one motor generator or other electric motor may be included. A hybrid control module 138 may control the motor generator 132 based on signals from the control module 110.

Surfaces of the radiator 124 are coated in a catalyst 160 that converts ozone ($O_3$) into oxygen ($O_2$). The catalyst 160 may include, for example, a PremAir catalyst by BASF or another suitable coating that converts ozone into oxygen. Air flowing into the radiator 124 from outside the vehicle system 100 includes ozone. As the air flows through the radiator 124 and past the catalyst 160, the catalyst 160 converts ozone in the air into oxygen. Accordingly, air flowing into the engine compartment 129 after being treated by the catalyst 160 includes less ozone than the air flowing into the radiator 124.

The vehicle system 100 includes an upstream ozone sensor 164 and a downstream ozone sensor 165. The upstream ozone sensor 164 is located upstream of the radiator 124 and measures an amount of the ozone in the air flowing into (i.e., upstream of) the radiator 124. The upstream ozone sensor 164 generates an upstream ozone signal 166 based on the amount of ozone upstream of the radiator 124. The downstream ozone sensor 165 is located downstream of the radiator 124 and measures an amount of the ozone in the air flowing out of (i.e., downstream of) the radiator 124. The downstream ozone sensor 165 generates a downstream ozone signal 167 based on the amount of ozone downstream of the radiator 124.

The control module 110 receives the upstream and downstream ozone signals 166 and 167. The control module determines how much ozone the catalyst 160 is converting into oxygen based on the upstream and downstream ozone signals 166 and 167. For example only, the control module 110 may determine an ozone conversion efficiency of the catalyst 160 based on a difference between the amount of ozone in the air flowing into the radiator 124 and the amount of ozone in the air flowing out of the radiator 124.

The control module 110 may diagnose the presence of one or more faults in the catalyst 160, the upstream ozone sensor 164, and/or the downstream ozone sensor 165. For example, the control module 110 may compare the ozone conversion efficiency with a threshold. If the ozone conversion efficiency is less than threshold, the control module 110 may indicate that the catalyst 160 includes a fault because the catalyst 160 is insufficiently converting ozone to oxygen. Conversely, if the ozone conversion rate is greater than or equal to the threshold, the control module 110 may determine that the catalyst 160 is sufficiently converting ozone to oxygen.

The control module 110 may take one or more remedial actions when a fault is present, such as determining whether one or more other faults are present and/or activating an indicator lamp 170 (e.g., a malfunction indicator lamp). The control module 110 may also adjust determination of the ozone conversion efficiency (before comparison with the threshold) based on other known, measured, or estimated conditions, including, but not limited to, ambient and vehicle temperatures, humidity, vehicle speed, and operation of the fan 126. The control module 110 may adjust the threshold (before the comparison) based on one or more known, measured, or estimated conditions, such as the humidity. One or more other sensors may be included, such as a humidity sensor 172. The humidity sensor 172 measures humidity in the air and generates a humidity signal based on the amount of humidity in the air.

The upstream and/or downstream ozone sensors 164 and 165 may be heated metal oxide semiconductor (HMOS) ozone sensors, electro-chemical ozone sensors, or an ultraviolet (UV) absorption sensor. The upstream and downstream ozone sensors 164 and 165 generate the upstream and downstream ozone signals 166 and 167 from electrical power that is supplied to the upstream and downstream ozone sensors 164 and 165, for example, by the ESD 134.

The control module 110 may control the application of electrical power to the upstream and downstream ozone sensors 164 and 165. For example only, the control module 110 may apply electrical power to the upstream and downstream ozone sensors 164 and 165 when an ignition key is an ON position, selectively while the vehicle and the engine are off, and/or under one or more other suitable circumstances. The control module 110 may apply electrical power to the upstream and downstream ozone sensors 164 and 165 while the vehicle and the engine are off, for example, in conjunction with determining whether a fault is present in one or both of the upstream and downstream ozone sensors 164 and 165.

HMOS ozone sensors each include a (resistive) heater that also receives power when power is supplied to the upstream and downstream sensors. The heater of an HMOS sensor warms the HMOS ozone sensor to greater than a threshold temperature. The ozone measurements of HMOS ozone sensors may be less accurate at temperatures less than the threshold temperature. The fact that the temperature of an HMOS ozone sensor is greater than the threshold temperature may be inferred when power has been applied to the HMOS ozone sensor for at least a predetermined period. Electro-chemical ozone sensors may not need a heater and may suitably measure ozone at temperatures that are less than the threshold temperature.

The upstream and downstream ozone sensors 164 and 165 may be sensitive to environmental conditions within the engine compartment 129 that may interfere with the ability of the upstream and downstream ozone sensors 164 and 165 to measure the amount of ozone in the air. For example, the upstream and downstream ozone sensors 164 and 165 may be sensitive to temperature, humidity, other chemicals such as hydrocarbons, and/or various types of electrical signals (e.g., electromagnetic field and radio frequency signals). Accordingly, the upstream and downstream ozone sensors 164 and 165 may include one or more structural modifications to prevent the environmental conditions from interfering with the upstream and downstream ozone sensors' 164 and 165 ability to measure ozone.

Figure 2:
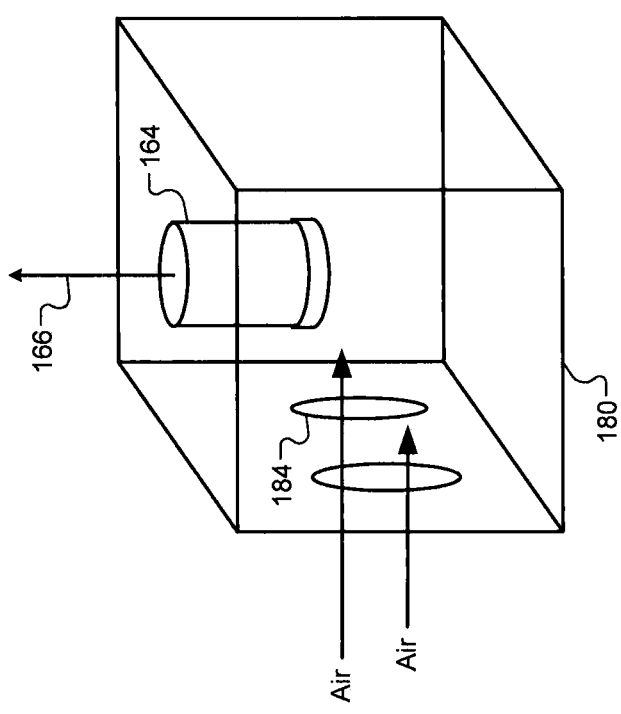
FIG. 2 illustrates a grounded metal housing for an ozone sensor according to the present disclosure.

For example, as shown in FIG. 2, the upstream ozone sensor 164 is encased in a grounded metal housing 180. While only the upstream ozone sensor 164 is shown and will be discussed, the downstream ozone sensor 165 may also be encased in a housing, such as the housing 180.

The housing 180 is grounded via mechanical communication with the radiator or other suitable structure within the vehicle system 100. The housing 180 shields the upstream and downstream ozone sensors 164 and 165 from high temperatures and EMF/RF signals while allowing air to reach the upstream and downstream ozone sensors 164 and 165. For example, the housing 180 may include one or more openings 184 that allow air to reach the upstream and downstream ozone sensors 164 and 165. Further, the upstream and downstream ozone sensors 164 and 165 may be at least partially coated in a protective sealant (for example only, an epoxy sealant) to prevent moisture and humidity from damaging or affecting the performance of the upstream and downstream ozone sensors 164 and 165.

Figure 3:
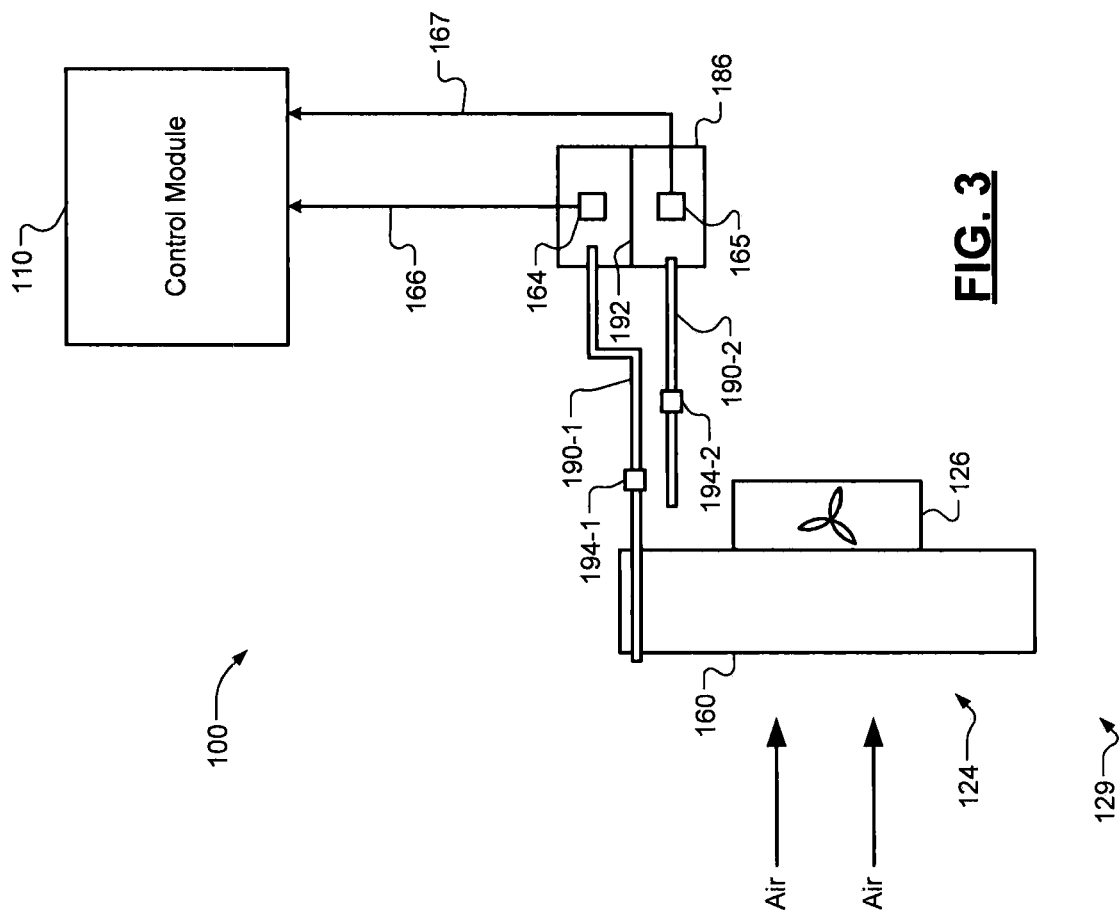
FIG. 3 is a functional block diagram of another example vehicle system implementing ozone sensors according to the present disclosure.

Referring now to FIG. 3, the upstream and downstream ozone sensors 164 and 165 may be located remotely from the radiator 124. For example, the upstream and downstream ozone sensors 164 and 165 may be located in a housing 186 in a passenger compartment, trunk, or other location outside of the engine compartment 129. One or more conduits 190 provide air to the upstream and downstream ozone sensors 164 and 165 from upstream and downstream of the radiator 124, respectively.

For example, a first conduit 190-1 has a first end located upstream of the radiator 124 and a second end located within the housing 186. The first conduit 190-1 provides air flowing into the radiator 124 (and into the first end of the first conduit 190-1) to the upstream ozone sensor 164 via the second end of the first conduit 190-1. A second conduit 190-2 has a first end located downstream of the radiator 124 and a second end located within the housing 186. The second conduit 190-2 provides air flowing out of the radiator 124 (and into the first end of the second conduit 190-2) to the downstream ozone sensor 165 via the second end of the second conduit 190-2. The upstream and downstream ozone sensors 164 and 165 may be separated by a partition 192 within the housing 186 to prevent cross contamination of the air provided to the upstream and downstream ozone sensors 164 and 165.

In various implementations, one or both of the first and second conduits 190-1 and 190-2 may include inline fans or air pumps 194-1 and 194-2 that facilitate air flow to the upstream and downstream ozone sensors 164 and 165. In another implementation, only the first conduit 190-1 includes the air pump 194-1, and the fan 126 is used to facilitate air flow to the downstream ozone sensor 165.

Figure 4:
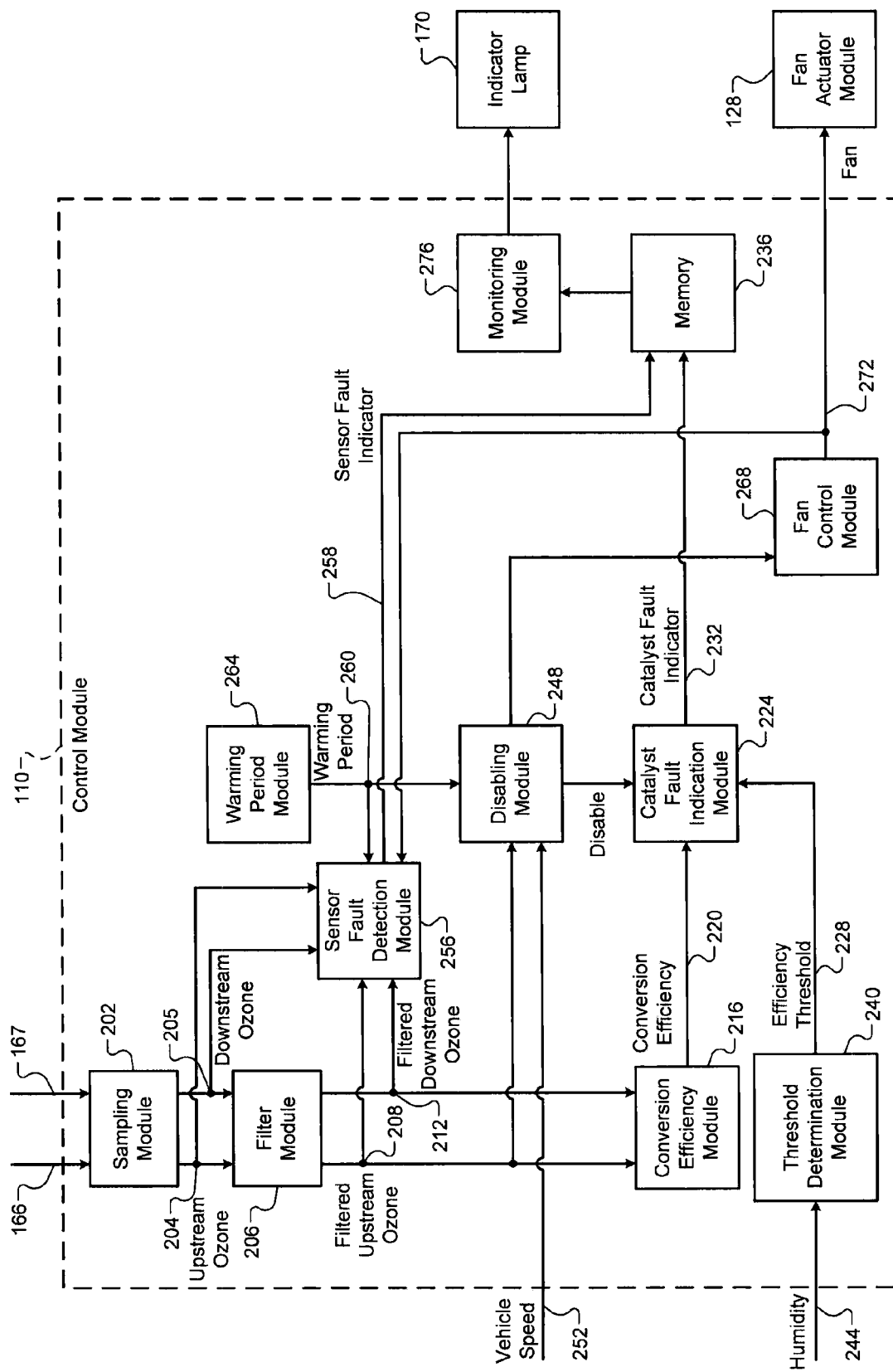
FIG. 4 is a functional block diagram of an example fault indication system according to the present disclosure.

Referring now to FIG. 4, a functional block diagram of an example implementation of the control module 110 is presented. A sampling module 202 receives the upstream and downstream ozone signals 166 and 167 generated by the upstream and downstream ozone sensors 164 and 165, respectively. The sampling module 202 samples the upstream and downstream ozone signals 166 and 167 at a predetermined rate, such as once every 500 milliseconds (ms), 1 second, or another suitable rate. The sampling module 202 outputs upstream and downstream ozone samples 204 and 205 corresponding to amounts of ozone upstream and downstream of the catalyst 160, respectively.

A filter module 206 may apply a filter to the upstream ozone sample 204 to generate a filtered upstream ozone sample 208. The filter module 206 may apply the filter to the downstream ozone sample 205 to generate a filtered downstream ozone sample 212. One or more previous values of the upstream ozone sample 204 may be used with the filter to generate the filtered upstream ozone sample 208. One or more previous values of the downstream ozone sample 205 may be used with the filter to generate the filtered downstream ozone sample 212. The filter may include, for example, a low pass filter or another suitable type of filter. The filtered upstream and downstream ozone samples 208 and 212 corresponding to amounts of ozone upstream and downstream of the catalyst 160, respectively.

A conversion efficiency module 216 determines an ozone conversion efficiency 220 of the catalyst 160 based on the filtered upstream and downstream ozone amounts 208 and 212. The ozone conversion efficiency 220 of the catalyst 160 may correspond to an amount or percentage of ozone flowing into the catalyst 160 that is converted by the catalyst into oxygen. The conversion efficiency module 216 may determine the ozone conversion efficiency 220 of the catalyst 160 using the equation:

$$CE = \frac{-(Y-X)}{X},$$

where CE is the ozone conversion efficiency 220 of the catalyst 160, Y is the filtered downstream ozone sample 212, and X is the filtered upstream ozone sample 208.

When enabled, a catalyst fault indication module 224 determines whether a fault is present in the catalyst 160 while the vehicle is in an ON state. The vehicle may be in an ON state when an ignition system of the vehicle is ON (e.g., when the ignition key is in the ON position). The catalyst fault indication module 224 indicates whether a fault is present in the catalyst 160 based on the ozone conversion efficiency 220 of the catalyst 160. More specifically, the catalyst fault indication module 224 indicates whether the ability of the catalyst 160 to react with ozone flowing past the catalyst 160 is less than a threshold value.

When enabled, the catalyst fault indication module 224 indicates whether the fault is present in the catalyst 160 based on a comparison of the ozone conversion efficiency 220 and an efficiency threshold 228. The catalyst fault indication module 224 may increment a sample count each time that the ozone conversion efficiency 220 is compared with the efficiency threshold 228. The catalyst fault indication module 224 may increment a failure count each time that the ozone conversion efficiency 220 is less than the efficiency threshold 228.

While the sample count is less than a first predetermined value, the catalyst fault indication module 224 indicates that the fault is present in the catalyst 160 when the failure count is greater than a second predetermined value. The first and second predetermined values are integers, and the second predetermined value is less than the first predetermined value. If the sample count becomes greater than the first predetermined value and the failure count is not greater than the second predetermined value, the catalyst fault indication module 224 may indicate that the fault is not present in the catalyst 160.

The catalyst fault indication module 224 may indicate whether the fault is present in the catalyst 160 using a catalyst fault indicator 232. For example only, the catalyst fault indication module 224 may store the catalyst fault indicator 232 in memory 236 when the fault is present in the catalyst 160. The catalyst fault indicator 232 may include, for example, setting a diagnostic trouble code (DTC) or another suitable indicator that the fault is present in the catalyst 160.

A threshold determination module 240 determines the efficiency threshold 228 based on a humidity 244 of ambient air. This may be done because the upstream and downstream ozone sensors 164 and 165 may be sensitive to humidity and/or one or more other factors. The threshold determination module 240 may determine the efficiency threshold 228 using one of a function and a mapping that relates the humidity 244 to the efficiency threshold 228. The humidity 244 may be generated based on humidity measured using the humidity sensor 172 or obtained in another suitable manner.

A disabling module 248 selectively enables and disables the catalyst fault indication module 224. The disabling module 248 selectively enables and disables the catalyst fault indication module 224, for example, based on the filtered upstream ozone sample 208, a vehicle speed 252, and one or more other parameters.

The disabling module 248 disables the catalyst fault indication module 224 when the vehicle speed 252 is less than a threshold speed. For example only, the threshold speed may be approximately 5 miles per hour (mph) or another suitable speed. When the vehicle speed 252 is less than the threshold speed, an insufficient amount of air may be flowing through the catalyst 160 to accurately determine whether the ability of the catalyst 160 to convert ozone into oxygen is less than the threshold value. When the vehicle speed 252 is less than the threshold speed, the disabling module 248 may also require that the fan 126 be OFF to disable the catalyst fault indication module 224. Despite the vehicle speed 252 being less than the threshold speed, the fan 126 being ON may provide a sufficient amount of airflow through the catalyst 160 to accurately determine whether the ability of the catalyst 160 to convert ozone into oxygen is less than the threshold value.

A rate of airflow through the radiator 124 may be determined based on the vehicle speed 252 and a speed of the fan 126. The disabling module 248 may selectively enable and disable the catalyst fault indication module 224 based on the rate of airflow through the radiator 124. The disabling module 24 may disable the catalyst fault indication module 224 when the rate of airflow through the radiator 124 is less than a predetermined rate.

Additionally or alternatively, the disabling module 248 disables the catalyst fault indication module 224 when the filtered upstream ozone sample 208 is less than a threshold amount. For example only, the threshold amount may be approximately 10 parts per billion (ppb) or another suitable value. The threshold amount may be set based on a minimum amount of ozone that the upstream and downstream ozone sensors 164 and 165 can accurately measure. When the filtered upstream ozone sample 208 is less than the threshold amount, the filtered downstream ozone sample 212 should be even smaller, and an insufficient amount of ozone may be flowing into the catalyst 160 to accurately determine whether the ability of the catalyst 160 to convert ozone into oxygen is less than the threshold value.

The disabling module 248 selectively enables and disables the catalyst fault indication module 224 further based on whether one or more relevant faults are present. More specifically, the disabling module 248 disables the catalyst fault indication module 224 when one or more of the relevant faults are present.

Relevant faults include faults that may affect the accuracy of the upstream and/or downstream ozone signals 166 and 167. For example only, relevant faults may include one or more different types of faults in one or more of the upstream and downstream ozone sensors 164 and 165, a fault in a connection between one or more of the upstream and downstream ozone sensors 164 and 165 and the control module 110, a fault in a provider of power to the upstream and downstream ozone sensors 164 and 165, a fault in a vehicle speed determination, a fault in the fan 126, a fault in one of the inputs to the disabling module 248, etc.

A sensor fault detection module 256, as discussed further in conjunction with FIG. 5, below, indicates whether one or more different types of faults are present in the upstream and/or downstream ozone sensors 164 and 165. The sensor fault detection module 256 may generate a sensor fault indicator 258 that indicates whether and which one or more different types are present in the upstream and/or downstream ozone sensors 164 and 165. The disabling module 248 may determine whether one or more of the relevant faults are present based on whether one or more fault indicators associated with the one or more relevant faults, respectively, have been generated and/or stored in the memory 236.

In implementations where one or both of the upstream and downstream ozone sensors 164 and 165 is a HMOS ozone sensor, the disabling module 248 selectively enables and disables the catalyst fault indication module 224 based on a warming period 260. More specifically, the disabling module 248 disables the catalyst fault indication module 224 when the warming period 260 is less than a threshold period. For example only, the threshold period may be approximately 60 seconds (1 minute) or less or another suitable period.

A warming period module 264 tracks the warming period 260. The warming period 260 corresponds to the period that power has been applied to the upstream and downstream ozone sensors 164 and 165 since the control module 110 last began applying power to the upstream and downstream ozone sensors 164 and 165.

In sum, the disabling module 248 may disable the catalyst fault indication module 224 when at least one of:

(1) the vehicle speed 252 is less than the threshold speed;

(2) the filtered upstream ozone sample 208 is less than the threshold amount;

(3) one or more of the relevant faults are present; and (4) the warming period 260 is less than the threshold period.

Conversely, the disabling module 248 may enable the catalyst fault indication module 224 when:

(1) the vehicle speed 252 is greater than the threshold speed and/or the fan 126 is ON;

(2) the filtered upstream ozone sample 208 is greater than the threshold amount;

(3) none of the relevant faults are present; and (4) the warming period 260 is greater than the threshold period.

A fan control module 268 generates a fan signal 272, and the fan actuator module 128 controls the fan 126 based on the fan signal 272. When the catalyst fault indication module 224 is enabled, the fan control module 268 turns the fan 126 ON if the fan 126 is not already ON. Where the fan 126 is a variable speed fan, the fan control module 268 may set the fan signal 272 for operation of the fan 126 at a maximum speed when the catalyst fault indication module 224 is enabled.

A monitoring module 276 may monitor the memory 236. The monitoring module 276 may activate the indicator lamp 170 when the fault is present in the catalyst 160. One or more other remedial actions may be taken when the fault is present in the catalyst 160. The monitoring module 276 may activate the indicator lamp 170 when one or more other faults are present, such as when one or more faults are present in one or more of the upstream and downstream ozone sensors 164 and 165.

Figure 5:
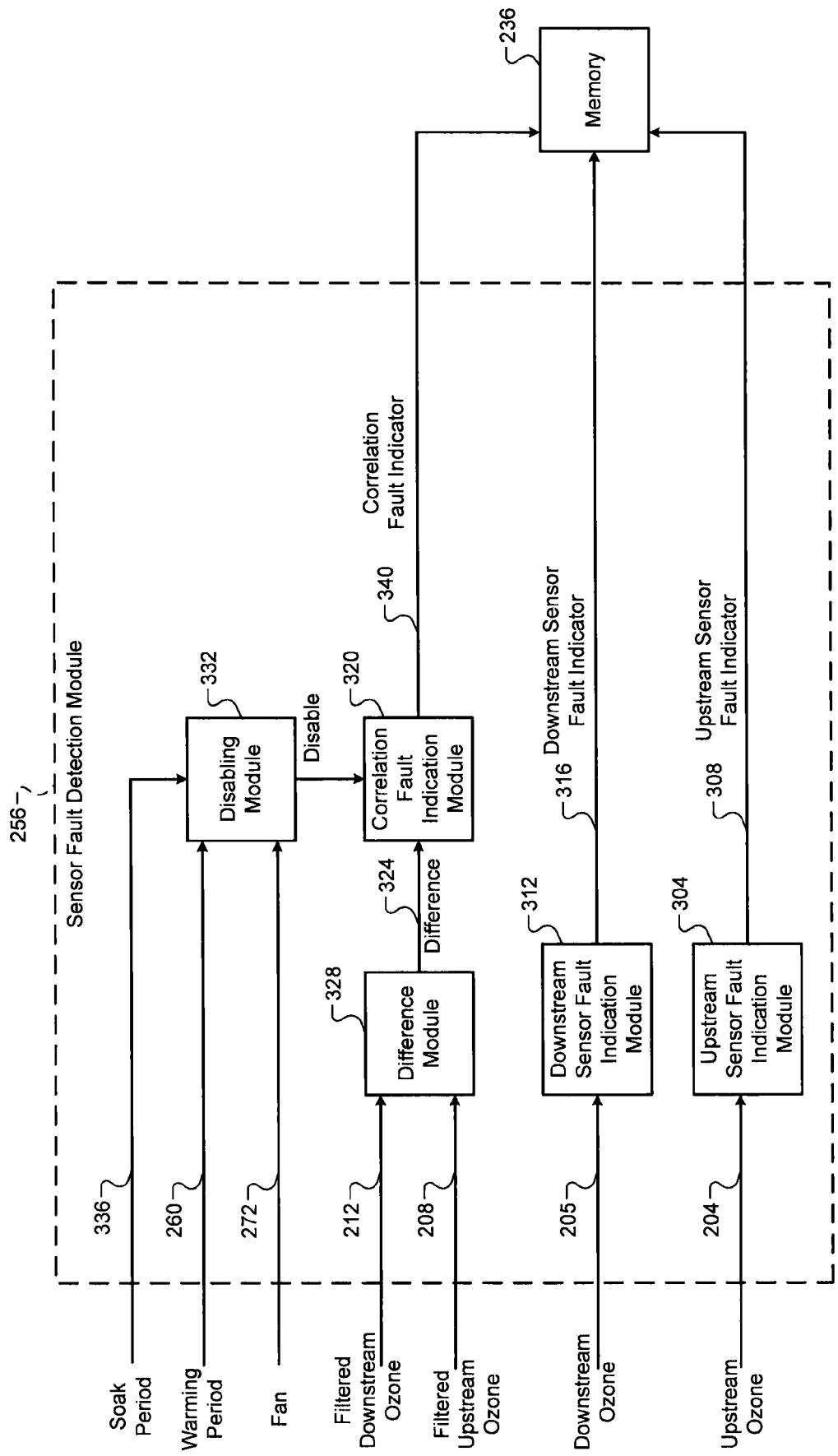
FIG. 5 is a functional block diagram of an example sensor fault indication system according to the present disclosure.

Referring now to FIG. 5, a functional block diagram of an example implementation of the sensor fault detection module 256 is presented. A first fault indication module 304 indicates whether an open circuit fault is present in the upstream ozone sensor 164. The first fault indication module 304 may also indicate whether a short circuit fault is present in the upstream ozone sensor 164. The upstream ozone sensor 164 is acting as an open circuit when an open circuit fault is present in the upstream ozone sensor 164. The upstream ozone sensor 164 is acting as a short circuit when a short circuit fault is present in the upstream ozone sensor 164. A short circuit fault may be a short to a ground source or a short to a power source.

The first fault indication module 304 determines whether an open circuit fault or a short circuit fault is present in the upstream ozone sensor 164 based on the upstream ozone sample 204. In implementations where the upstream ozone sensor 164 is an HMOS ozone sensor, the first fault indication module 304 may wait (or be disabled) until the warming period 260 is greater than the threshold period before determining whether an open circuit fault or a short circuit fault is present in the upstream ozone sensor 164.

When the upstream ozone sensor 164 does not include an open circuit fault or a short circuit fault, the upstream ozone signal 166 may vary between a minimum value and a maximum value based on the amount of ozone measured. For example only, in implementations where the upstream ozone sensor 164 is a 5 V ozone sensor, the upstream ozone signal 166 may vary between 0.5 V and 4.5 when the upstream ozone sensor 164 does not include an open circuit fault or a short circuit fault. The maximum and minimum values correspond to maximum and minimum threshold amounts, respectively.

The first fault indication module 304 may determine that an open circuit fault is present in the upstream ozone sensor 164 when the upstream ozone sample 204 is less than the minimum threshold amount. For example only, the first fault indication module 304 may determine that an open circuit fault is present when at least X of a set of Y number of values of the upstream ozone sample 204 are less than the minimum threshold amount.

The first fault indication module 304 may determine that a short circuit fault is present in the upstream ozone sensor 164 when the upstream ozone sample 204 is greater than the maximum threshold amount. For example only, the first fault indication module 304 may determine that a short circuit fault is present when at least X of a set of Y number of values of the upstream ozone sample 204 are greater than the maximum threshold amount. X and Y are integers greater than zero, and Y is greater than or equal to X.

The first fault indication module 304 may indicate whether a short circuit fault or an open circuit fault is present in the upstream ozone sensor 164 using an upstream sensor fault indicator 308. For example only, the first fault indication module 304 may set a DTC in the memory 236 when an open circuit fault is present in the upstream ozone sensor 164. The first fault indication module 304 may set another DTC in the memory 236 when a short circuit fault is present in the upstream ozone sensor 164. DTCs are specific to a type of fault to help a user viewing set DTCs to identify a source of a fault.

A second fault indication module 312 indicates whether an open circuit fault is present in the downstream ozone sensor 165. The second fault indication module 312 may also indicate whether a short circuit fault is present in the downstream ozone sensor 165. The downstream ozone sensor 165 is acting as an open circuit when an open circuit fault is present in the downstream ozone sensor 165. The downstream ozone sensor 165 is acting as a short circuit when a short circuit fault is present in the downstream ozone sensor 165.

The second fault indication module 312 determines whether an open circuit fault or a short circuit fault is present in the downstream ozone sensor 165 based on the downstream ozone sample 205. In implementations where the downstream ozone sensor 165 is an HMOS ozone sensor, the second fault indication module 312 may wait (or be disabled) until the warming period 260 is greater than the threshold period before determining whether an open circuit fault or a short circuit fault is present in the downstream ozone sensor 165.

When the downstream ozone sensor 165 does not include an open circuit fault or a short circuit fault, the downstream ozone signal 166 may vary between the minimum value and the maximum value based on the amount of ozone measured. As stated above, the maximum and minimum values correspond to maximum and minimum threshold amounts, respectively.

The second fault indication module 312 may determine that an open circuit fault is present in the downstream ozone sensor 165 when the downstream ozone sample 205 is less than the minimum threshold amount. For example only, the second fault indication module 312 may determine that an open circuit fault is present when at least X of a set of Y number of values of the downstream ozone sample 205 are less than the minimum threshold amount.

The second fault indication module 312 may determine that a short circuit fault is present in the downstream ozone sensor 165 when the downstream ozone sample 205 is greater than the maximum threshold amount. For example only, the second fault indication module 312 may determine that a short circuit fault is present when at least X of a set of Y number of values of the downstream ozone sample 205 are greater than the maximum threshold amount. X and Y are integers greater than zero, and Y is greater than or equal to X.

The second fault indication module 312 may indicate whether a short circuit fault or an open circuit fault is present in the downstream ozone sensor 165 using a downstream sensor fault indicator 316. For example only, the second fault indication module 312 may set a DTC in the memory 236 when an open circuit fault is present in the downstream ozone sensor 165. The second fault indication module 312 may set another DTC in the memory 236 when a short circuit fault is present in the downstream ozone sensor 165.

When enabled, a third fault indication module 320 indicates whether a correlation fault is present in the upstream and/or downstream ozone sensors 164 and 165. In other words, the third fault indication module 320 indicates whether the amount of ozone measured by the upstream ozone sensor 164 correlates with the amount of ozone measured by the downstream ozone sensor 165. The third fault indication module 320 is enabled when the amount of airflow through the catalyst 160 is minimal, such as when the vehicle is OFF and the fan 126 is OFF.

The third fault indication module 320 determines whether a correlation fault is present based on an ozone difference 324. The third fault indication module 320 may determine that a correlation fault is present when the ozone difference 324 is greater than a threshold difference. The third fault indication module 320 may determine that a correlation fault is present when at least U of a set of W number of values of the ozone difference 324 are greater than the threshold difference. U and W are integers greater than zero, and W is greater than or equal to U. For example only, the threshold difference may be approximately 5 ppb or another suitable value. A difference module 328 may determine the ozone difference 324 based on a difference between the filtered upstream ozone sample 208 and the filtered downstream ozone sample 212.

A disabling module 332 selectively enables and disables the third fault indication module 320. The disabling module 332 disables the third fault indication module 320 when a soak period 336 is less than a second threshold period and/or the fan 126 is ON or has been on during a last threshold period. The soak period 336 may correspond to a period that the vehicle has been OFF since the ignition system of the vehicle was last turned OFF. For example only, the second threshold period may be approximately ten minutes or more. The last threshold period may be, for example, approximately five minutes or more. The disabling module 332 may additionally or alternatively disable the third fault indication module 320 when the warming period 260 is less than the threshold period if HMOS ozone sensors are implemented to ensure that the HMOS ozone sensors are sufficiently warm.

The third fault indication module 320 indicates whether a correlation fault is present in the upstream and/or downstream ozone sensors 164 and 165 using a correlation fault indicator 340. For example only, the third fault indication module 320 may set a DTC in the memory 236 when a correlation fault is present in the upstream and/or downstream ozone sensors 164 and 165.

Figure 6:
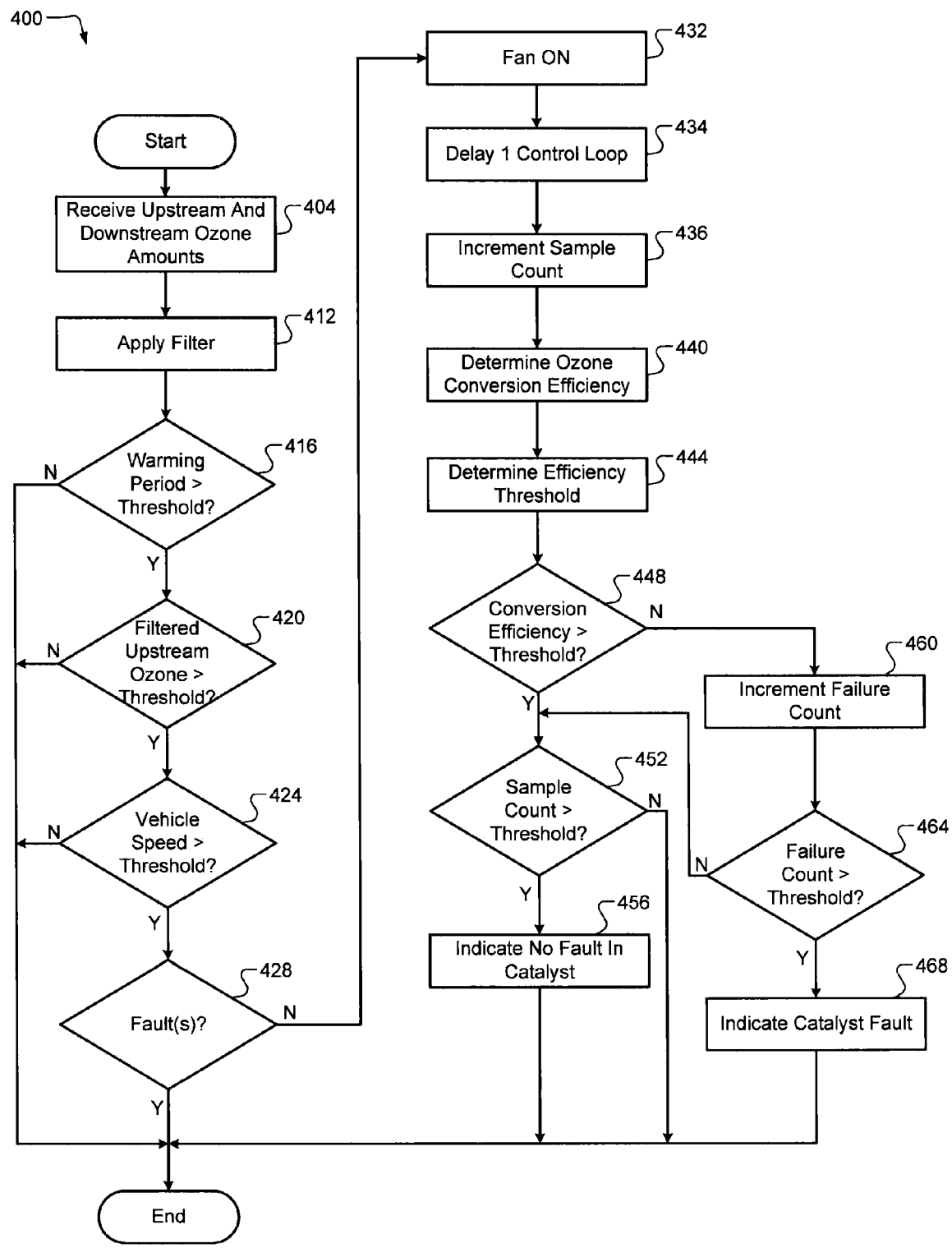
FIG. 6 is a flowchart depicting an example method of determining and indicating whether a fault is present in a catalyst that reduces ozone into oxygen according to the present disclosure.

Referring now to FIG. 6, a flowchart depicting an example method 400 of determining and indicating whether a fault is present in the catalyst 160 is presented. The presence of the fault in the catalyst 160 indicates that the ability of the catalyst 160 to convert ozone into oxygen is less than the threshold value.

Control may begin with 404 where control receives the upstream and downstream ozone amounts 204 and 205. Control may determine whether open circuit and short circuit is present in the upstream and/or downstream ozone sensors 164 and 165 based on the upstream and downstream ozone amounts 204 and 205, respectively. Control applies the filter to the upstream and downstream ozone amounts 204 and 205 at 412 to generate the filtered upstream and downstream ozone amounts 208 and 212, respectively.

At 416, control determines whether the warming period 260 is greater than the threshold period. If true, control may continue with 420; if false, control may end. Control may determine whether the filtered upstream ozone sample 208 is greater than the threshold amount at 420. If true, control may continue with 424; if false, control may end.

At 424, control may determine whether the vehicle speed 252 is greater than the predetermined speed. If true, control may continue with 428; if false, control may end. Control may determine whether one or more of the relevant faults are present at 428. If true, control may end; if false, control may continue with 432. At 432, control turns the fan 126 ON if the fan 126 is not already ON. Control may command operation of the fan 126 at the maximum speed in implementations where the fan 126 is a variable speed fan. Control may wait for 1 control loop at 434 before continuing with 436. Control may also verify that the fan 126 is still ON after waiting before continuing with 436.

Control may increment a sample count at 436. At 440, control determines the ozone conversion efficiency 220 of the catalyst 160. Control determines the ozone conversion efficiency 220 based on the filtered upstream and downstream ozone amounts 208 and 212. For example only, control may determine the ozone conversion efficiency 220 using the equation:

$$CE = \frac{-(Y-X)}{X},$$

where CE is the ozone conversion efficiency 220 of the catalyst 160, Y is the filtered downstream ozone sample 212, and X is the filtered upstream ozone sample 208.

Control may determine the efficiency threshold 228 at 444. Control determines the efficiency threshold 228 based on the humidity 244. Control may determine the efficiency threshold 228, for example, using one of a function and a mapping that relates the humidity 244 to the efficiency threshold 228.

At 448, control determines whether the ozone conversion efficiency 220 of the catalyst 160 is greater than the efficiency threshold 228. If true, control continues with 452. If false, control transfers to 460, which is discussed further below. At 452, control determines whether the sample count is greater than the first predetermined value. If true, control indicates that the fault is not present in the catalyst 160 at 456, and control may end. If false, control may end.

At 460 (when the ozone conversion efficiency 220 is less than the efficiency threshold 228 at 448), control increments the failure count. Control determines whether the failure count is greater than the second predetermined value at 464. If true, control indicates that the fault is present in the catalyst 160 at 468, and control may end. If false, control may continue with 452, as discussed above. The presence of the fault indicates that the ability of the catalyst 160 to convert ozone into oxygen is less than the threshold value. Control may set the DTC associated with the catalyst 160 having the fault in the memory 236. The indicator lamp 170 may be activated and/or one or more other remedial actions may be taken when the fault is present in the catalyst 160. While control is shown and discussed as ending, the method 400 may be illustrative of one control loop, and control may return to 404.

Figure 7:
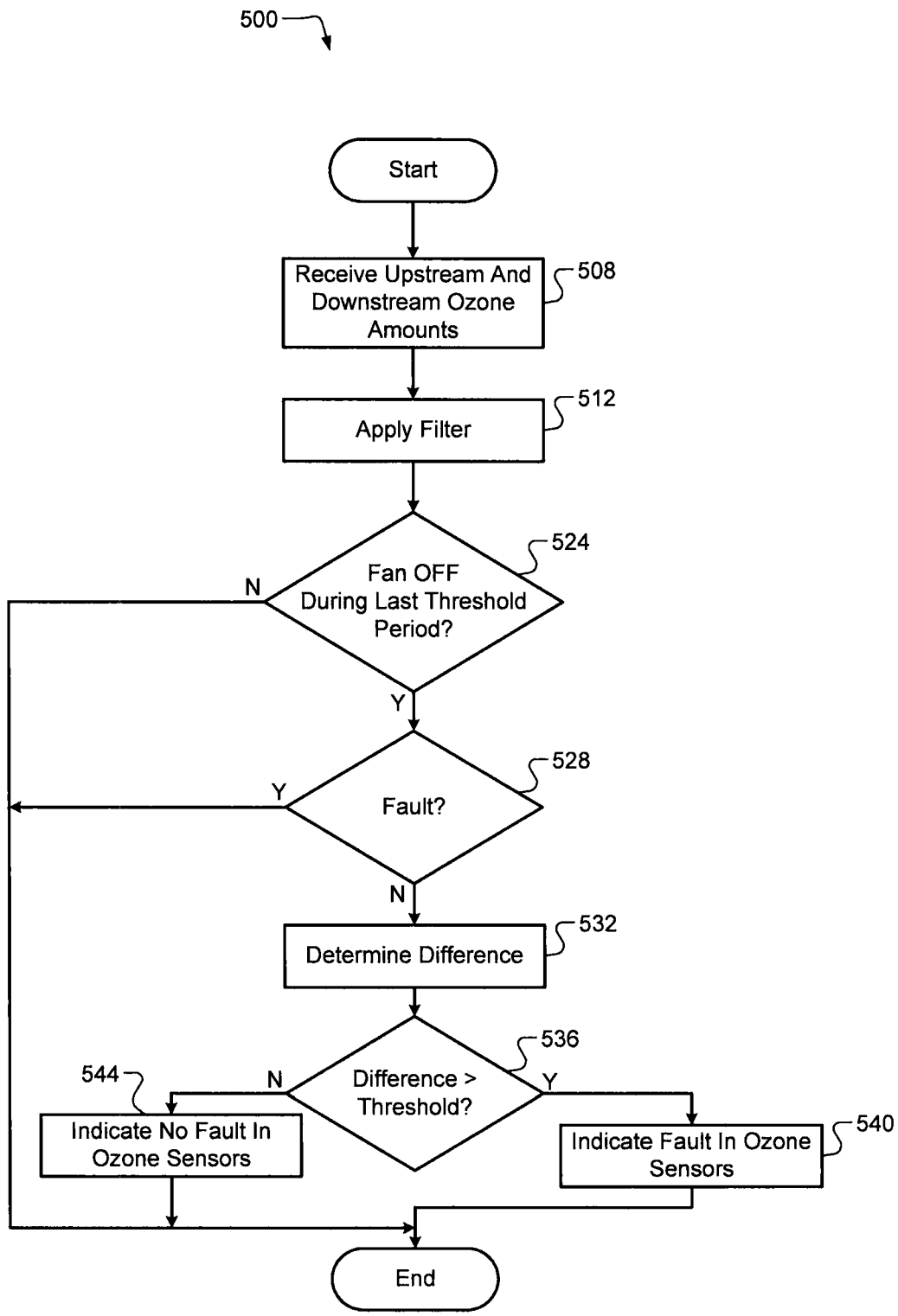
FIG. 7 is a flowchart depicting an example method of determining and indicating whether a fault is present in one or more ozone sensors according to the present disclosure.

Referring now to FIG. 7, a flowchart depicting an example method 500 of determining and indicating whether a correlation fault is present in one or more of the upstream and downstream ozone sensors 164 and 165 is presented. Control may begin in response to the engine 102 being shut OFF (e.g., key off). So long as power was applied before the engine 102 was shut OFF for at least the threshold period, if HMOS ozone sensors are implemented, the HMOS ozone sensors will be sufficiently warm. In various implementations, control may verify that the period that power was applied before the engine 120 was shut OFF is greater than the threshold period before proceeding to 508.

At 508, power is applied to the upstream and downstream ozone sensors 164 and 165, and control receives the upstream and downstream ozone amounts 204 and 205. Control applies the filter to the upstream and downstream ozone amounts 204 and 205 at 512 to generate the filtered upstream and downstream ozone amounts 208 and 212, respectively.

Control may determine whether the fan 126 has been OFF during the last threshold period at 524. If true, control may continue with 528. If false, control may end. At 528, control may determine whether one or more relevant faults are present. If true, control may end. If false, control may continue with 532. At 532, control may determine the ozone difference 324. Control determines the ozone difference 324 based on a difference between the filtered upstream and downstream ozone amounts 208 and 212.

At 536, control determines whether the ozone difference 324 is greater than the threshold difference. If true, control may indicate that a correlation fault is present in the upstream ozone sensor 164 and/or the downstream ozone sensor 165 at 540, and control may end. If false, control may indicate that a correlation fault is not present in the upstream and downstream ozone sensors 164 and 165 at 544, and control may end. In various implementations, control may increment a sample count each time the ozone difference is determined at 532 and increment a failure count each time the ozone difference 324 is greater than the threshold difference. Control may indicate whether a correlation fault is present based on the failure and sample count values similar to 452-468 as discussed above in conjunction with the catalyst 160. While control is shown and discussed as ending, the method 500 may be illustrative of one control loop, and control may return to 504.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a conversion efficiency module that generates an ozone conversion efficiency of a catalyst that converts ozone into oxygen based on a first amount of ozone in air measured upstream of the catalyst and a second amount of ozone in air measured downstream of the catalyst;
a threshold determination module that generates an efficiency threshold based on ambient humidity; and
a catalyst fault indication module that selectively indicates that a fault is present in the catalyst when the ozone conversion efficiency is less than the efficiency threshold.

2. The system of claim 1 wherein the threshold determination module generates the efficiency threshold using one of a function and a mapping that relates the ambient humidity to the efficiency threshold.

3. The system of claim 1 further comprising a disabling module that disables the catalyst fault indication module when the first amount is less than a threshold amount.

4. The system of claim 1 further comprising a disabling module that disables the catalyst fault indication module when a vehicle speed is less than a threshold speed.

5. The system of claim 1 further comprising:
a filter module that generates the first and second amounts based on signals output by first and second ozone sensors located upstream and downstream of the catalyst, respectively; and
a disabling module that disables the catalyst fault indication module when a fault is present in at least one of the first and second ozone sensors.

6. The system of claim 1 further comprising:
a filter module that generates the first and second amounts based on signals output by first and second heated metal oxide semiconductor (HMOS) ozone sensors located upstream and downstream of the catalyst, respectively; and
a disabling module that disables the catalyst fault indication module when a period that power has been applied to the first and second HMOS sensors is less than a threshold period.

7. The system of claim 1 wherein the conversion efficiency module sets the ozone conversion efficiency based on a difference between the first and second amounts.

8. The system of claim 1 wherein the catalyst is a coating that is applied to a heat exchanger of the vehicle.

9. The system of claim 1 further comprising a filter module that generates the first and second amounts based on signals output by first and second heated metal oxide semiconductor (HMOS) ozone sensors located upstream and downstream of the catalyst, respectively.

10. The system of claim 1 further comprising a filter module that generates the first and second amounts based on signals output by first and second electro-chemical ozone sensors located upstream and downstream of the catalyst, respectively.

11. A method for a vehicle, comprising:
generating, using a conversion efficiency module, an ozone conversion efficiency of a catalyst that converts ozone into oxygen based on a first amount of ozone in air measured upstream of the catalyst and a second amount of ozone in air measured downstream of the catalyst;
generating, using a threshold determination module, an efficiency threshold based on ambient humidity; and
selectively indicating, using a catalyst fault indication module, that a fault is present in the catalyst when the ozone conversion efficiency is less than the efficiency threshold.

12. The method of claim 11 further comprising generating the efficiency threshold using one of a function and a mapping that relates the ambient humidity to the efficiency threshold.

13. The method of claim 11 further comprising preventing the selective indication when the first amount is less than a threshold amount.

14. The method of claim 11 further comprising preventing the selective indication when a vehicle speed is less than a threshold speed.

15. The method of claim 11 further comprising:
generating the first and second amounts based on signals output by first and second ozone sensors located upstream and downstream of the catalyst, respectively; and
preventing the selective indication when a fault is present in at least one of the first and second ozone sensors.

16. The method of claim 11 further comprising:
generating the first and second amounts based on signals output by first and second heated metal oxide semiconductor (HMOS) ozone sensors located upstream and downstream of the catalyst, respectively; and
preventing the selective indication when a period that power has been applied to the first and second HMOS sensors is less than a threshold period.

17. The method of claim 11 further comprising setting the ozone conversion efficiency based on a difference between the first and second amounts.

18. The method of claim 11 further comprising generating the first and second amounts based on signals output by first and second heated metal oxide semiconductor (HMOS) ozone sensors located upstream and downstream of the catalyst, respectively.

19. The method of claim 11 further comprising generating the first and second amounts based on signals output by first and second electro-chemical ozone sensors located upstream and downstream of the catalyst, respectively.

20. A vehicle comprising:
a catalyst that converts ozone into oxygen and that is applied to a heat exchanger of the vehicle;
a first ozone sensor that measures a first amount of ozone in air upstream of the catalyst;
a second ozone sensor that measures a second amount of ozone in air downstream of the catalyst; and
an engine control module (ECM) including:
a conversion efficiency module that generates an ozone conversion efficiency of the catalyst based on the first amount of ozone upstream of the catalyst and the second amount of ozone downstream of the catalyst;
a threshold determination module that generates an efficiency threshold based on ambient humidity; and
a catalyst fault indication module that selectively indicates that a fault is present in the catalyst when the ozone conversion efficiency is less than the efficiency threshold.

* * * * *